United States Patent [19]
Vorköper

[11] Patent Number: 5,984,661
[45] Date of Patent: Nov. 16, 1999

[54] VALVE-GATED INJECTION MOULDING DEVICE

[75] Inventor: Rainer Vorköper, Auerbach, Germany

[73] Assignee: Eurotool Beheer B.V., 'S-Gravendeel, Netherlands

[21] Appl. No.: 08/940,380

[22] Filed: Sep. 30, 1997

[30] Foreign Application Priority Data

Sep. 30, 1996 [EP] European Pat. Off. .............. 96202723

[51] Int. Cl.⁶ .................................................. B29C 45/23
[52] U.S. Cl. .......................................... 425/562; 425/564
[58] Field of Search .................................. 425/562, 563, 425/564, 565, 566

[56] References Cited

U.S. PATENT DOCUMENTS

| | | |
|---|---|---|
| 3,488,810 | 1/1970 | Gellert . |
| 3,915,358 | 10/1975 | Hehl . |
| 4,212,626 | 7/1980 | Gellert ..................................... 425/562 |
| 4,449,915 | 5/1984 | Van Den Brink ........................ 425/564 |
| 4,919,606 | 4/1990 | Gellert . |
| 5,208,046 | 5/1993 | Shah et al. . |

FOREIGN PATENT DOCUMENTS

| | | |
|---|---|---|
| 0 282 999 | 9/1988 | European Pat. Off. . |
| 0 312 098 | 4/1989 | European Pat. Off. . |
| 0 405 663 | 1/1991 | European Pat. Off. . |

*Primary Examiner*—Tim Heitbrink
*Attorney, Agent, or Firm*—Young & Thompson

[57] ABSTRACT

A valve-gated injection moulding device in which an actuating device of the valve pin comprises a sliding member having its walls in sliding engagement with an axial guide track. The sliding member comprises a radial opening defined by an upper and a lower contact surface. A free end of an actuating lever having two curved actuating surfaces extends radially into the opening of the sliding member. Thanks to this construction, a compact and accurate actuating device is provided which reduces radial forces on the valve pin, such that it can be operated without friction or wear. Residual radial forces are taken up by the sliding member. The stroke of the actuating device can be adjusted after mounting in a cavity plate of an injection moulding device.

7 Claims, 3 Drawing Sheets

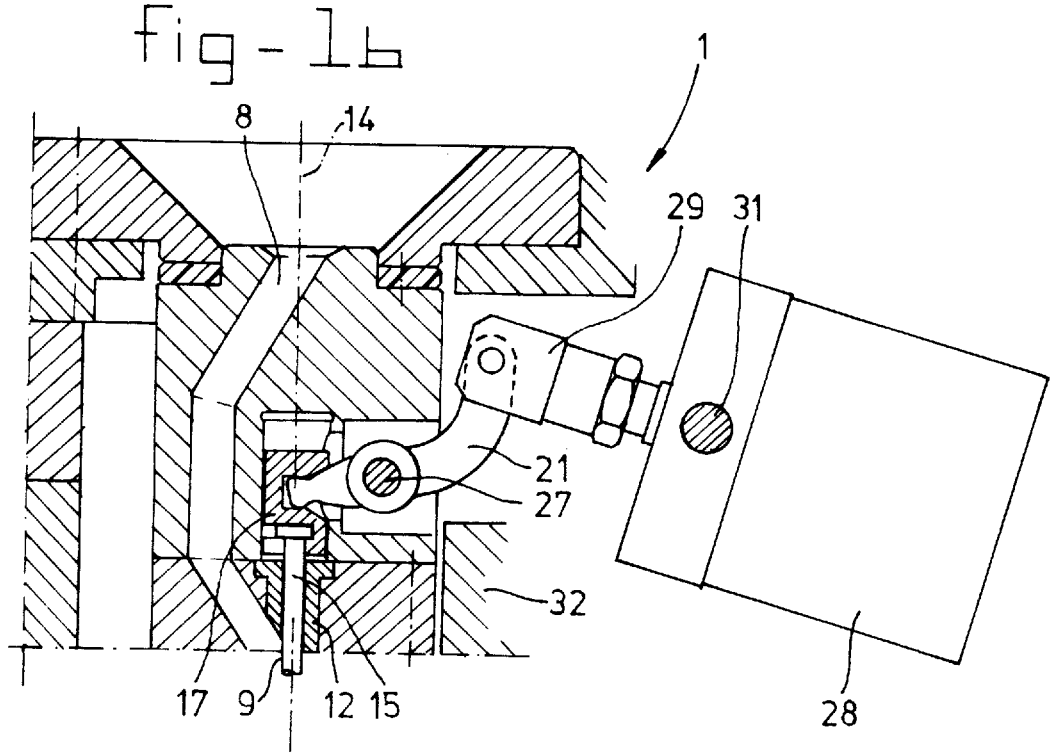
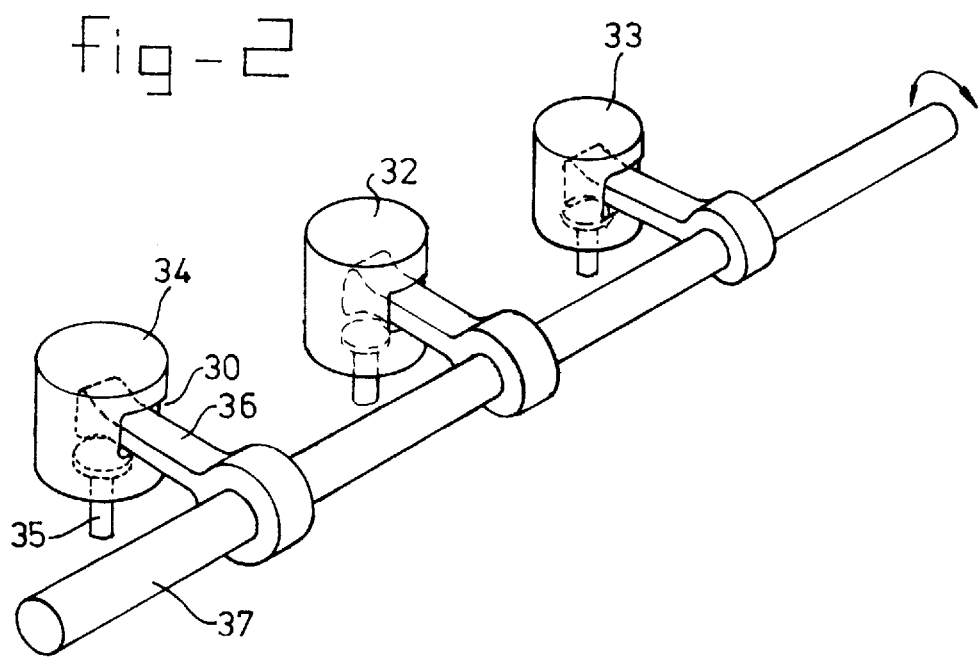

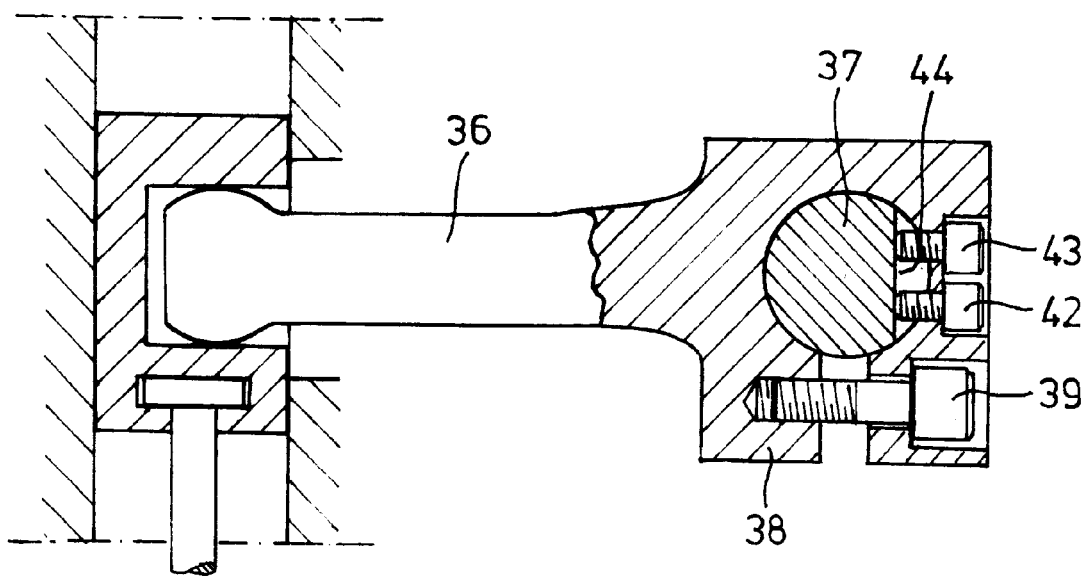

VALVE-GATED INJECTION MOULDING DEVICE

FIELD OF THE INVENTION

The invention relates to a valve-gated injection moulding device comprising:

- a nozzle with an elongated melt passage having a forward end and a rear end,
- a gate located at the forward end of the nozzle,
- a valve pin mounted in the melt passage and being movable in the axial direction thereof, the valve pin having a tip for closing off the gate and a rear end having a contact surface, and
- an actuating device connected with the rearward end of the valve pin for moving the valve pin in the axial direction, the actuating device comprising a lever having a free end with an actuating surface in rolling engagement with the contact surface of the valve pin and a driven end which is rotatable around a rotation axis which is radially displaced with respect to the valve pin.

BACKGROUND OF THE INVENTION

Such a valve-gated injection moulding device is known from EP-A-282 999. In the known injection moulding device, a mechanically actuated valve pin is used for opening and closing the gate in a so-called hot-runner injection moulding device. In the hot-runner device, heating elements are provided along the melt passage of the nozzle for maintaining the thermoplastic material which is to be injected through the gate into an injection cavity, in a molten state. The valve pin is guided in a guide bushing which also functions as a seal for the thermoplastic material. Therefore there is very little play between the valve pin and the guide bushing such as to maintain a sufficient seal (for instance at a 4 millimeter diameter of the valve pin, only 0.005 millimeter play can be allowed). The valve pin should be very accurately guided to avoid jamming of the valve pin. Thereto it is very important to only load the valve pin in an axial direction and to avoid exerting radial forces thereon. Radial forces exerted on the valve pin cause a friction which should be overcome, requiring more energy in the actuating means for the valve pin, may cause stick-slip phenomena, inaccurate positioning of the valve pin, wear, etc. As the guide bushing of the valve pin cannot be lubricated, the avoidance of radial forces is very important. During the high operating temperatures (200–300° C.) most lubricants will flow out of the lubrication gap, and can leak into the molten thermoplastic material causing contamination.

In the known actuating device of the valve pin as shown in EP-A-0 282 999, the rearward end of the valve pin is cylindrical and is received into a U-shaped bracket of a lever which radially extends towards the valve pin. By pivoting the lever around a pivot point, the valve pin can be moved in the axial direction, while the cylindrical surface of the valve pin head slides with respect to the actuating surfaces of the U-shaped bracket at the end of the lever. The known actuating device has as a disadvantage that radial forces are still exerted on the valve pin head. Accurate guiding of the rearward end of the valve pin is not possible. Furthermore, the stroke of the valve pin is limited and cannot be easily adjusted to prevailing process conditions after mounting the nozzle in the cavity plate.

It is also known to provide actuating devices which are axially aligned with the valve pin. These systems have as a disadvantage that adjustment of the valve pin height after mounting in the cavity plate is no longer possible. Furthermore is a large space above the nozzle required for such axially aligned systems. For single-nozzle systems which are directly connected to the injection moulding device, this space is not available.

SUMMARY OF THE INVENTION

It is an object of the present invention to provide a valve-gated injection moulding device having a compact actuating device for the valve pin, which can easily be adjusted after mounting in a cavity plate of an injection moulding cavity.

It is a further object of the present invention to provide an actuating device which to a large extent avoids radial forces to be exerted on the valve pin and allows for accurate guiding and positioning of the valve pin. Thereto the injection moulding device according to the present invention is characterized in that the rear end of the valve pin comprises a sliding member having its walls in sliding engagement with an axial guide track, the sliding member comprising a radial opening defined by an upper and a lower contact surface, the free end of the lever having two curved actuating surfaces and extending radially into the opening of the sliding member. The rear end of the valve pin is accurately guided along the guide track by the sliding member in an axial direction. This ensures an accurate radial positioning of the valve pin, during axial movement. During axial movement, the curved actuating surfaces of the free end of lever roll along the upper and lower contact surfaces of the sliding member. Hereby radial forces on the valve pin are avoided, and no radial forces are exerted on the guide bushing/sealing structure. Small radial forces due to a non-ideal rolling movement of the curved actuating surfaces of the lever over the control surfaces of the sliding member, are taken up by the sliding member.

The contact surface of the sliding member and the actuating surfaces of the lever are preferably configured such that a perfect rolling movement of the surfaces is possible without slip.

In an embodiment of the injection moulding device according to the present invention the rear end of the valve pin, comprises a transverse head, the sliding member comprising a bottom cavity with an axial cross-section substantially corresponding with the cross-section of the head of the valve pin, in which cavity the head of the valve pin can be inserted in a radial direction which is substantially transverse to the radial orientation of the lever.

According to this embodiment, the sliding member is formed by a separate element which can be easily placed around the head of the valve pin and can be easily detached. The head of the valve pin is received in the cavity of the sliding member preferably with zero axial play. After mounting the sliding member on the valve pin, the free end of the lever can be mounted into the radial opening thereof in a simple manner.

Preferably the driven end of the lever is hingingly connected to a piston rod of an actuating cylinder, at a position radially outwardly from the rotation axis which actuating cylinder is connected to a support structure of the injection moulding device. Hereby the height of the valve pin and the stroke thereof can be adjusted by positioning of the cylinder even after the nozzle and the actuating device have been mounted on the cavity plate. The cylinder can be rotatably connected to the support structure of the injection moulding device such that the cylinder body is rotated upon actuation of the valve pin.

To facilitate mounting of the actuating cylinder, the driven part of the lever that extends radially outwardly from the rotation axis may be curved.

BRIEF DESCRIPTION OF THE DRAWINGS

Several embodiments of the valve-gated injection moulding device according to the present invention will be illustrated by way of example with reference to the accompanying drawings. In the drawings:

FIGS. 1a–1c show a valve gated injection moulding device according to the present invention in respectively the opened and the closed position, FIG. 2 shows a schematical perspective view of an actuating device for a valve-gated injection moulding device having multiple nozzles, and FIG. 3 shows a cross-sectional view of the actuating device as shown in FIG. 2 along a radial cross-sectional line.

DETAILED DESCRIPTION OF THE INVENTION

Figure 1A:
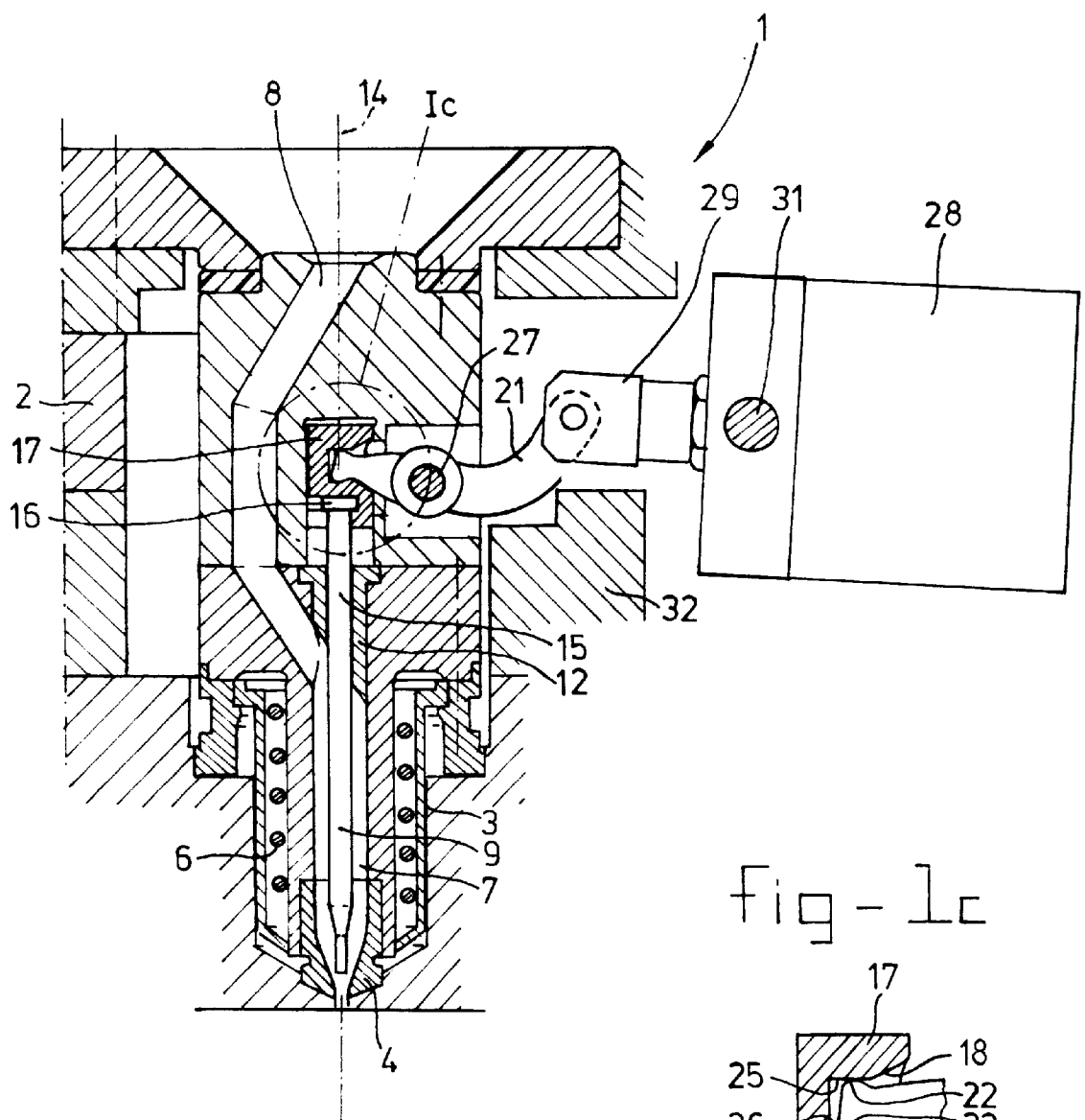

FIG. 1a shows a cross-sectional view of a part of a valve-gated injection moulding device 1. In the injection moulding device, a nozzle 3 is placed in a cavity plate 2. At its bottom end, the nozzle 3 comprises a gate 4 which terminates in a mould cavity, the details of which are not shown in the figure. The nozzle 3 comprises a central melt passage 7. From an injection moulding machine, which is not shown in this figure, molten thermo-plastic material is transferred via an upstream melt passage 8 towards the melt passage 7. Heating elements 6 extend around the melt passage 7 for maintaining the thermoplastic material in a molten state. When the mould cavity has been filled with molten thermoplastic material, a valve pin 9 can be moved along an axial direction of the melt passage 7. In the figure, the axial direction is the direction along the center line 14. The valve pin 9 is guided in a guide bushing 12 which also acts as a sealing element for the molten thermoplastic material. After solidification of the molten thermoplastic material in the mould cavity, the injection moulded objects can be removed therefrom, and the valve pin 9 can be retracted to open the gate 4 such that molten thermoplastic material can be introduced into the mould cavity. The rear end 15 of the valve pin 9 comprises a head 16 of larger radial dimensions. With "radial direction" it is meant a direction perpendicular to the centre line 14.

Figure 1C:
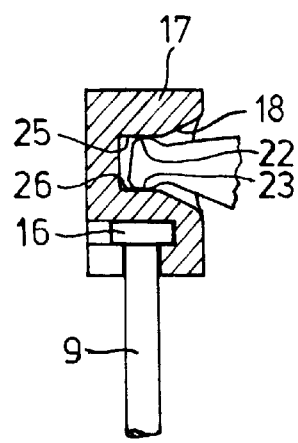

As can be seen in the enlarged detail of FIG. 1c, the valve-pin head 16 is received in a bottom cavity of a sliding member 17. The sliding member 17 comprises a radially extending opening 18 wherein a lever 21 is received. The sliding member 17 is connected via a lever 21 to an actuating cylinder 28.

The sliding member 17 slidingly engages with its outer surfaces the walls of a guide track that is axially aligned with the valve pin 9. Upon rotation of the lever 21 around rotation axis 27, the actuating surfaces 22, 23 of the free end of the lever evolve over the flat contact surfaces 25, 26 of the sliding member 17. In this manner the valve pin 9 is moved into a closed position as shown in FIG. 1b, while radial forces on the sliding member 17 are prevented.

At the lower end of the sliding member 17, the head 16 of the valve pin 9 is received in a cavity. The cavity has substantially the same cross-section as the rear end of the valve pin 9 and radially extends to the outer circumferential surface of the sliding member 17. In this way, the valve pin head 16 can be easily introduced into the cavity and can be removed therefrom for maintenance purposes or replacement.

The actuating cylinder 28 comprises a piston rod 29 which is hingingly connected to the curved driven end of the lever 21. The cylinder body is hingingly attached in a hingepoint 31 to the support 32 of the injection moulding device 1. As can be seen in FIG. 16, the cylinder 28 is hinged around hingepoint 31 upon closing of the gate 4 by downward movement of the valve pin 9.

FIG. 2 shows an actuating device for valve-gated injection moulding systems having multiple nozzles. Three sliding members 32, 33 and 34 are connected to respective valve pins 35. A lever 36 is connected to the rear end of the valve pins 35 in the manner as shown in FIGS. 1a–1c, through a radial opening 30 in the sliding members 32, 33 and 34 and is at its driven end clampingly connected around a common drive shaft 37. The drive shaft 37 can be driven for instance by means of a hydraulic cylinder, an electromotor and the like.

In FIG. 3 it can be seen that the driven end of lever 36 comprises clamping means 38 in which the drive shaft 37 is received. A clamping screw 39 secures the bracket 38 of the clamping means around the drive shaft. Two adjustment screws 42, 43 can be engaged with a flat surface 44 of the drive shaft 37 for fine adjustment of the lever 36.

I claim:

1. Valve-gated injection moulding device (1) comprising:
    a nozzle (3) with an elongated melt passage (7) having a forward end and a rear end,
    a gate (4) located at the forward end of the nozzle (3),
    a valve pin (9) mounted in the melt passage (7) and being movable in the axial direction thereof, the valve pin having a tip for closing off the gate (4) and a rear end (15) having a contact surface, and
    an actuating device (17, 21) connected with the rear end (15) of the valve pin (19) for moving the valve pin in the axial direction, the actuating device comprising a lever (21) having a free end with an actuating surface in rolling engagement with the contact surface of the valve pin and a driven end which is rotatable around a rotation axis (27) which is radially displaced with respect to the valve pin (9), characterized in that the rear end (15) of the valve pin (9) comprises a sliding member (17, 32, 33, 34) having walls in sliding engagement with an axial guide track, the sliding member (17) comprising a radial opening (18, 30) defined by an upper and a lower contact surface (25, 26), the free end of the lever (21) having two curved actuating surfaces (22, 23) and extending radially into the opening (18, 30) of the sliding member (17, 32, 33, 34).

2. Injection moulding device according to claim 1, wherein the rear end (15) of the valve pin (9) comprises a transverse head (16), the sliding member (17, 32, 33, 34) comprising a bottom cavity with an axial cross-section substantially corresponding with the cross-section of the head (16) of the valve pin, the head of the valve pin adapted to be inserted in said cavity in a radial direction which is substantially transverse to the radial orientation of the lever.

3. Injection moulding device (1) according to claim 1, wherein the driven end of the lever (21) is hingingly connected to a piston rod (29) of an actuating cylinder (28) at a position radially outwardly from the rotation axis (27) which actuating cylinder (28) is connected to a support structure (32) of the injection moulding device (1).

4. Injection moulding device according to claim 3, wherein the actuating cylinder (28) is rotatably connected to the support structure (32) of the injection moulding device.

5. Injection moulding device according to claim 3, wherein the driven end of the lever (21) is curved.

6. Injection moulding device according to claim 1, comprising at least two injection nozzles, each nozzle having a lever, each lever having a driven end, the driven end of each lever being connected to a common drive shaft (37) at the position of the rotation axis.

7. Injection moulding device according to claim 6, the drive shaft (37) having a flat surface (44), the drive end of each lever (36) comprising clamping means (38) which receive the drive shaft (37) therein, the clamping means (38) comprising adjustment elements (42, 43) engaging the flat surface (44) of the drive shaft (37).

* * * * *